United States Patent [19]

Nishimura

[11] Patent Number: 4,703,437
[45] Date of Patent: Oct. 27, 1987

[54] APPARATUS FOR SPECTROANALYSIS

[75] Inventor: Takashi Nishimura, Kyoto, Japan

[73] Assignee: Shimadzu Corporation, Kyoto, Japan

[21] Appl. No.: 668,322

[22] Filed: Nov. 5, 1984

[30] Foreign Application Priority Data

Nov. 7, 1983 [JP] Japan ............................. 58-209600

[51] Int. Cl.⁴ .......................................... G06F 15/20
[52] U.S. Cl. .................................... 364/498; 356/319
[58] Field of Search ..................... 364/497, 498, 525;
356/308, 319, 326

[56] References Cited

U.S. PATENT DOCUMENTS

| | | | |
|---|---|---|---|
| 4,093,991 | 6/1978 | Chirstie, Jr. et al. | 364/498 |
| 4,293,222 | 10/1981 | Caruso et al. | 356/319 |
| 4,322,807 | 3/1982 | Chamran et al. | 364/498 |
| 4,323,309 | 4/1982 | Akitomo et al. | 356/319 |
| 4,365,303 | 12/1982 | Hannah et al. | 364/498 |
| 4,568,186 | 2/1986 | Yoshimura et al. | 364/418 |

FOREIGN PATENT DOCUMENTS

| | | | |
|---|---|---|---|
| 2020009 | 11/1979 | United Kingdom | 356/319 |
| 2072841 | 10/1981 | United Kingdom | 356/319 |
| 2077966 | 12/1981 | United Kingdom | |
| 2108744 | 5/1983 | United Kingdom | |

Primary Examiner—Parshotam S. Lall
Attorney, Agent, or Firm—Franklin D. Wolffe; Morris Fidelman

[57] ABSTRACT

Apparatus for spectroanalysis which comprises a spectrophotometer, a first memory for storing programs for different types of unit data processing operations, a second memory having a plurality of channels for storing data, a keyboard containing a first group of keys for designating said programs, a second group of keys for entering parameters for data processing, and a key for selecting a multiple data processing mode, and a control circuit. Upon designation of a program for a unit data processing operation by one of the first group of keys the control circuit operates to process the output data produced by the spectrophotometer measuring a sample in accordance with the designated program, and upon selection of a multiple data processing mode and subsequent designation of programs for selected ones of the unit data processing operations by depressing the corresponding keys of the first group in a selected order, the control circuit operates to form a multiple data processing program for performing the designated unit data processing operations sequentially in the selected order and cause the output data of the spectrophotometer to be processed in accordance with the multiple data processing program.

6 Claims, 6 Drawing Figures

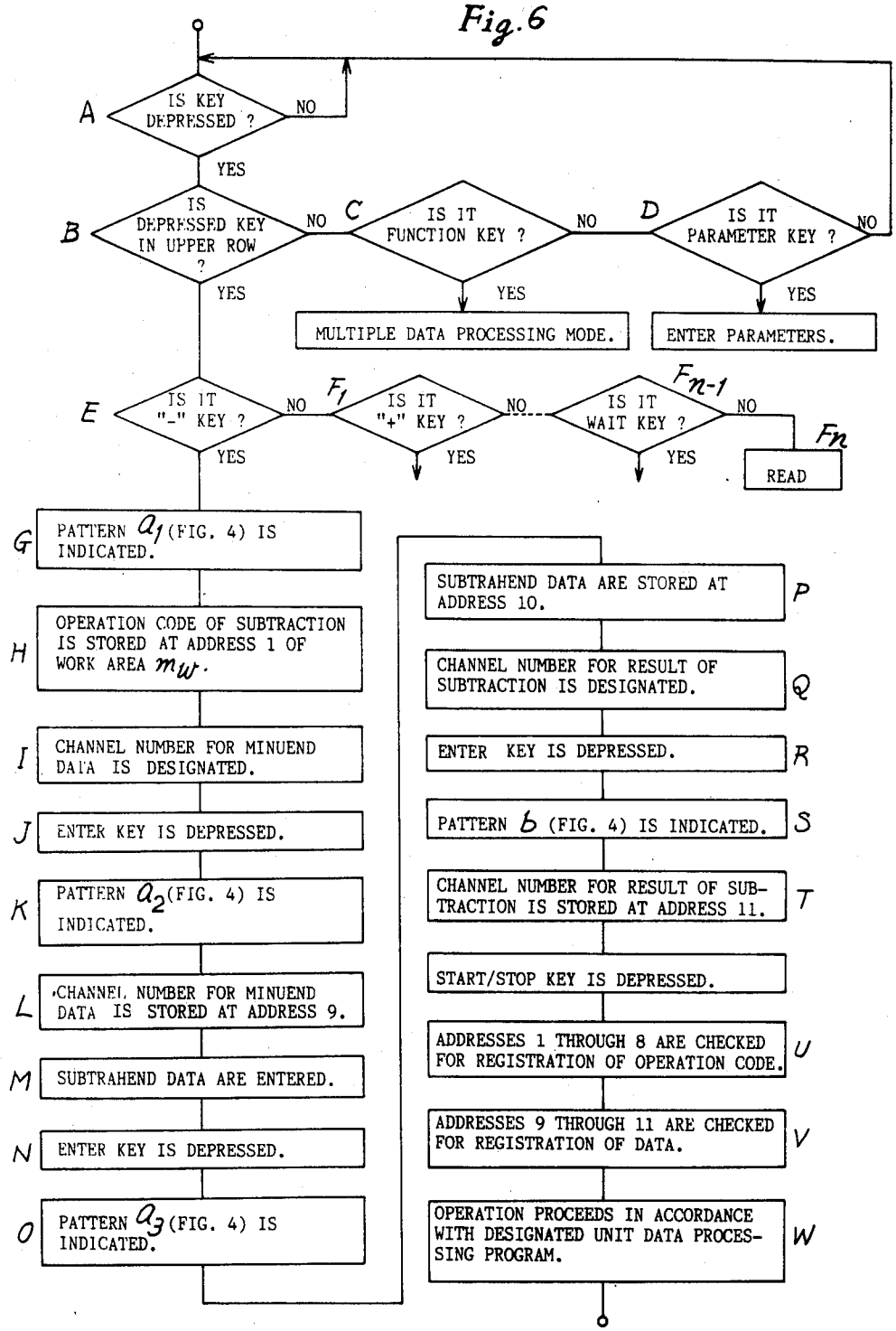

APPARATUS FOR SPECTROANALYSIS

BACKGROUND OF THE INVENTION

This invention relates to an apparatus for spectroanalysis, and more particularly to that portion of the apparatus which processes the output data of a spectrophotometer in accordance with different programs.

To obtain useful information from the output signals produced by a spectrophotometer as a result of measurement there are two data processing methods. One is to process the spectral data obtained from a single sample in the form of a curve plotted on a two-dimensional graph with the wavelength being taken along the ordinate and the magnitude of the output signal along the abscissa, while the other method is to process different data obtained from several samples measured with a fixed wavelength.

In connection with the former method there are various data processing operations for specific purposes such as to obtain difference spectra and derivative spectra, or for smoothing. The same is true with the latter data processing method. Each of these data processing operations is complete in itself in that a single or a plurality of pieces of information can be obtained by performing each data processing operation alone. The data processing operations of this characteristic will be referred to as a unit data processing operation. To take an example, for quantitative measurement of a specific component of solutes in a solvent having a curved baseline spectrum four kinds of data processing operations are required, that is, spectrum subtraction between the sample and the solvent, smoothing of the spectrum, spectrum differentiation, and calculation for quantitative determination. This type of data processing operation in which several unit data processing operations are performed successively on the original data will be referred to as a multiple data processing operation.

Conventional apparatuses for spectroanalysis are provided with individual keys each of which is intended for use for a specific unit data processing operation thereby to enable each unit data processing operation by simply depressing the corresponding specific key on the keyboard. However, to perform a multiple data processing operation comprising several unit data processing operations the same number of keys as the number of the unit data processing operations to be performed must be depressed one after another. To put it in detail, a first key is depressed to perform a first unit data processing operation on the original data, and a second key is then depressed to perform a second unit data processing operation on the processed data, and so on until the final nth key is depressed.

In the conventional apparatuses it is impossible to cause a multiple data processing operation to proceed automatically by designating at the start the sequence in which the unit data processing operations which constitute the multiple data processing operation are to be performed.

There is also known a spectrophotometer provided with a personal computer by which a desired program for the procedure of data processing can be made. However, the program for the data processing procedure must be written in a computer language such as BASIC and the work is complicated.

Accordingly, the primary object of the invention is to provide an apparatus for spectroanalysis which is capable of performing by a simple and easy operation not only individual unit data processing operations each of which is complete in itself but also a multiple data processing operation which comprises several unit data processing operations.

SUMMARY OF THE INVENTION

Briefly stated, the apparatus of the invention comprises a spectrophotometer, a memory for storing programs for a plurality of kinds of unit data processing operations, a keyboard including a plurality of keys each of which designates one of the unit data processing operations to be performed when depressed and a key for selecting a multiple data processing mode, and a control circuit.

When one of the keys is depressed to designate one of the unit data processing operations and the operation of the apparatus is started, the control circuit causes the designated unit data processing operation to be performed. When the multiple data processing mode selecting key is depressed and then selected ones of the keys for designating the unit data processing operations are depressed in a selected order, the control circuit forms a multiple data processing program, and when the operation of the apparatus is started, the control circuit causes the multiple data processing operation to be performed automatically in accordance with the formed program.

The invention will be described in detail with reference to the accompanying drawing.

BRIEF DESCRIPTION OF THE DRAWING

FIG. 6 is a flowchart showing the steps of a unit data processing operation performed by the data processor in FIG. 1.

DESCRIPTION OF THE PREFERRED EMBODIMENT

Figure 1:
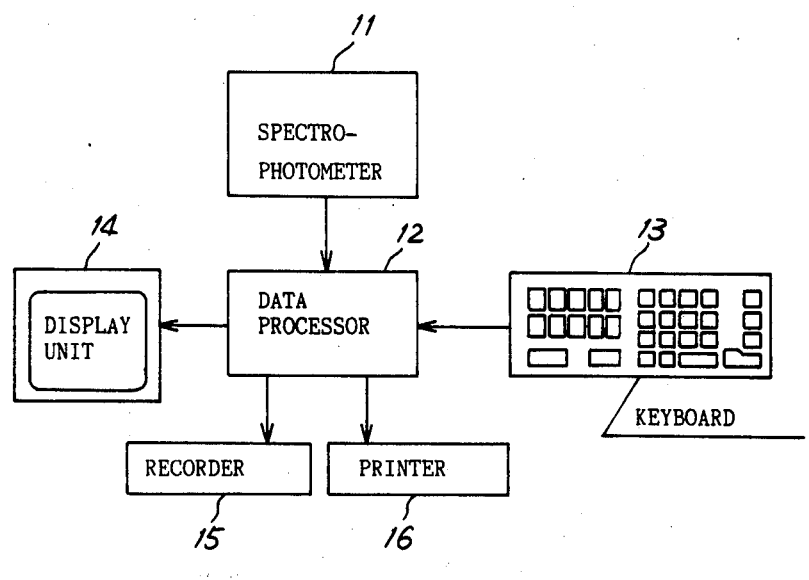
FIG. 1 is a block diagram showing the whole construction of the apparatus of the invention.

Referring to FIG. 1, there is shown a block diagram of an apparatus for spectroanalysis constructed in accordance with the invention, which comprises a spectrophotometer 11, a data processor 12, a keyboard 13, a display unit 14, a recorder 15 and a printer 16.

Figure 2:
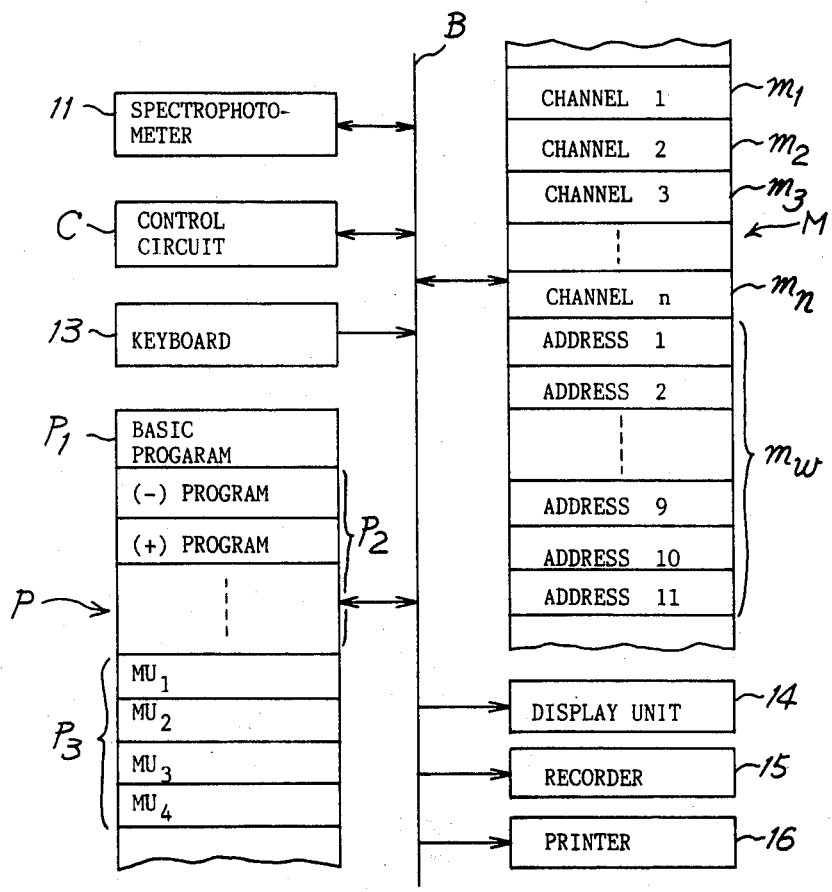
FIG. 2 is a block diagram showing the construction of the data processor in the apparatus of FIG. 1.

FIG. 2 schematically shows the internal construction of the data processor 12, which comprises a control circuit C, a program memory P and a random access memory M, with a bus line B interconnecting the circuit C, the memories P and M, the spectrophotometer 11 and the other input-output devices shown in FIG. 1.

The program memory P has a first area P1 for storing a program for the basic operations of the control circuit C, a second area P2 for storing a plurality of unit data processing programs and a third area P3 for storing a plurality of multi-wavelength data processing programs.

The random access memory M has a data storing area comprising a plurality of channels $m_1, m_2, m_3, \ldots m_n$ for storing original data to be processed, intermediate data, finished data, and various other data, respectively. The RAM also has a work area $m_w$ into or from which parameters, flags, etc. necessary for data processing are entered or taken out.

Figure 3:
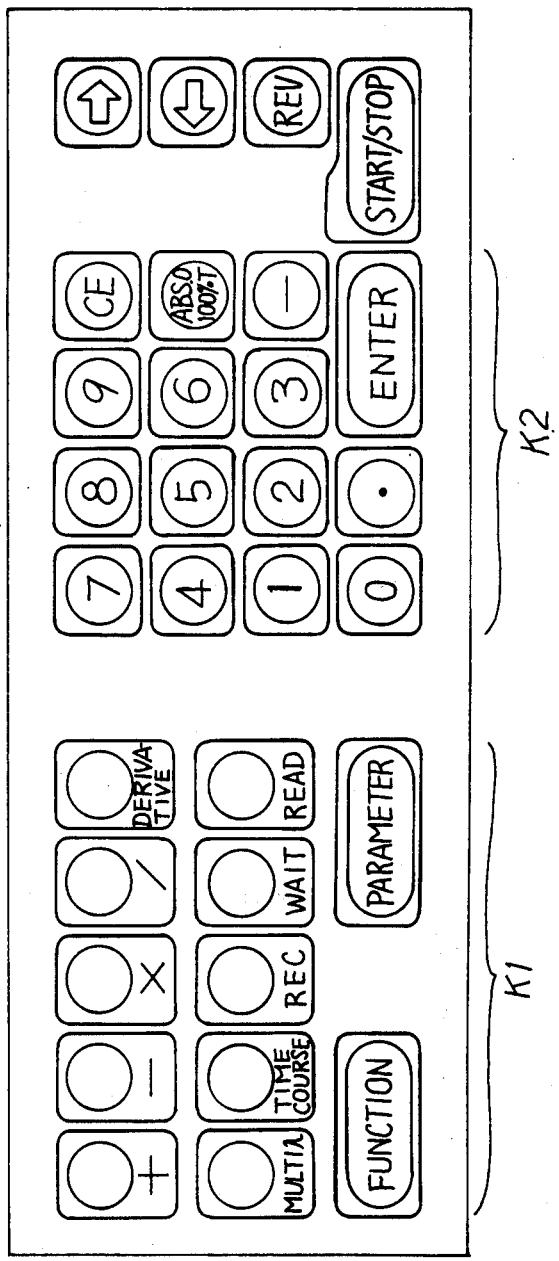
FIG. 3 is a top plan view of the keyboard used in the apparatus of FIG. 1.

As shown in FIG. 3, the keyboard 13 includes a first group of keys $K_1$ for designating the contents of data processing to be performed and a second group of keys $K_2$ for entering parameters required for the designated data processing to be performed.

The first group includes two parallel rows of keys for designating unit data processing operations. In the upper row there are arranged from left to right a key marked with the plus sign + (to be referred to as the "+" key) for designating the operation of addition, a "−" key for subtraction, a "X" key for multiplication, a "/" key for division, and a DERIVATIVE key for differentation. In the lower row there are arranged from left to right a MULTI-λ key, a TIME COURSE key, a REC. key, 8 WAIT key and a READ key.

The MULTI-λ key is for designating a multi-wavelength data processing operation. This type of data processing operation is such that first a data processing operation of a certain type is performed on a plurality of data obtained from a sample measured with different wavelengths, and that the processed data are further processed to obtain a synthetic result, such as, the mean value of all the data and the weighted mean value thereof.

Usually, the output of the spectrophotometer is plotted as a graph, with the wavelength of the measuring light being taken along the abscissa. When the TIME COURSE key is depressed, however, the monochromator of the spectrophotometer is stopped at a designated wavelength so as to sample the measured output at designated time intervals.

The REC, key is a key for causing the recorder to record the processed data, the WAIT key is a key for setting a waiting time in a timer, and the READ key is a key for effecting reading of the data stored in the channels $m_1$ to $m_n$ of the data storing area in the RAM.

The first group of keys $K_1$ further includes a FUNCTION key and a PARAMETER key. When the FUNCTION key is depressed, the machine is set to operate in a multiple data processing mode, and the PARAMETER key is depressed before entering parameters into the work area $m_w$ in the RAM by means of the keys of the second group $K_2$.

The procedure and operation of the apparatus for a unit data processing will now be described. A unit data processing operation for obtaining a baseline-corrected absorption spectrum of a sample is taken as an example.

In order to correct the curvature of the baseline of the spectrum of a sample due to absorption by the solvent, first the data of the absorption spectrum of the solvent only are obtained as baseline data, and then sample solutions of various concentration are measured to obtain their absorption spectra, from which the previously obtained baseline data (the absorption spectrum of the solvent only) are subtracted.

To obtain the baseline data the operation of addition can be used for unit data processing. Alternatively, the operation may also be subtraction, multiplication or division. Needless to say, the operation of subtraction is used as the unit data processing operation for baseline correction.

When the operation of addition is used as the unit data processing operation to obtain baseline data, 0 (zero) is added to the output data of the spectrophotometer and the value obtained as a result of the addition is stored in one of the data channels $m_1$ to $m_n$ in the RAM. If subtraction is used as the unit data processing operation to obtain baseline data, 0 (zero) is subtracted from the spectral data, or if multiplication or division is used, the data are multiplied or divided by 1 (one), and the result of the arithmetic operation is stored in one of the data channels in the RAM.

Figure 4:
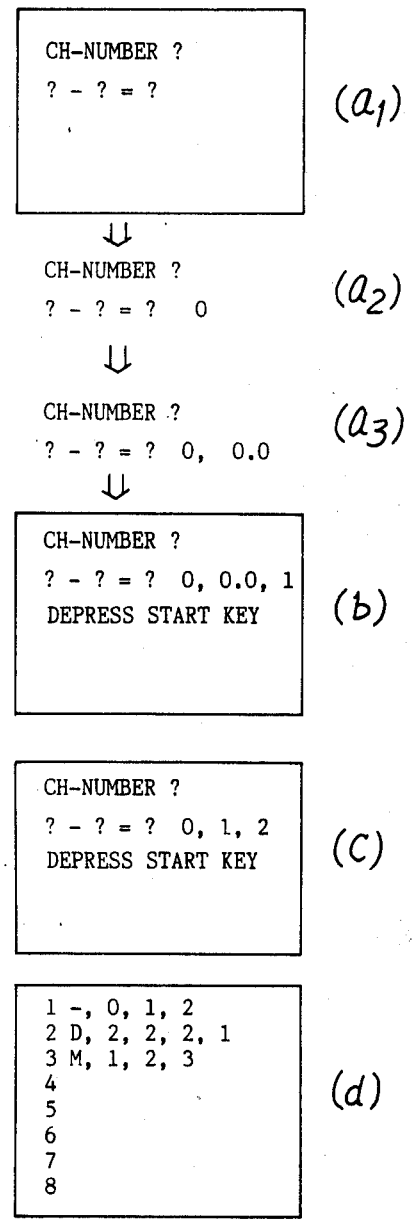
FIGS. 4 ($a1$–$a3$) to FIG. 4($d$) show various patterns appearing on the display unit used in the apparatus of FIG. 1.
Figure 5:
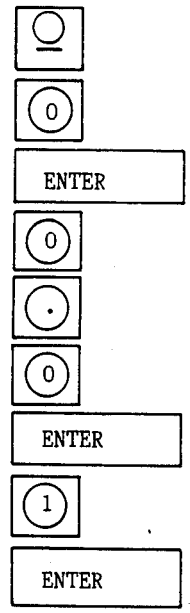
FIG. 5 shows the sequence of procedure in which the keys are depressed for performing the operation of subtraction.

To obtain baseline data the keys on the keyboard are operated in the order shown in FIG. 5. First, the "−" key is depressed, whereupon the pattern $a_1$ shown in FIG. 4 appears on the screen of the display unit 14. The pattern indicates that a channel number should now be entered. Here, the channel means a location in which data are stored. Channel 0 (zero) is the spectrophotometer itself, and the channels in the RAM are numbered 1 (one) and consecutively greater integers. The symbol "?" of the first term at the left side of the expression in the pattern $a_1$ indicates the location or channel where the minuend data are stored, and the symbol "?" of the second term indicates the location or channel where the subtrahend data are stored. The right side of the expression indicates the location or channel where the processed data are stored.

In the operation of obtaining baseline data, since the minuend data are the output of the spectrophotometer measuring the absorption spectrum of the solvent alone, the channel number to be designated is 0 (zero). So the 0 key is depressed and then the ENTER key to enter the channel number 0 into the computer, whereupon the pattern $a_1$ on the display screen changes to the one shown at $a_2$ in FIG. 4. In the expression the second term at the left side should be 0 (zero) since nothing is to be subtracted from the minuend data. Since integers are used to designate data channels, numbers with a fraction are used to express parameters. Then in the present case the 0 key and the "." (point) key and again the 0 key are depressed, and then the ENTER key to enter a value 0.0, whereupon the pattern displayed changes to the one shown at $a_3$ in FIG. 4. Suppose that the processed data should be stored in channel 1 (one) in the data memory area of the RAM. The 1 key is depressed and then the ENTER key, whereupon the operation of designating a unit data processing operation has been finished and a pattern shown at b in FIG. 4 appears on the display screen.

Then the START/STOP key at the lower right corner on the keyboard is depressed, whereupon the spectrophotometer operates to measure the absorption spectrum of the solvent, so that the result of the measurement, that is, the baseline data are put into channel 1 of the data memory area in the RAM.

When the baseline data have been obtained in the above-mentioned manner, the sample will now be measured. First, the "−" key is depressed to select the operation of subtraction as a unit data processing operation to be performed, whereupon the pattern $a_1$ in FIG. 4 appears on the screen of the display device. The minuend data are the output of the spectrophotometer, which is in channel 0, while the subtrahend data are the baseline data now stored in channel 1 of the data memory area in the RAM, as previously mentioned. Suppose that the data of the baseline-corrected spectrum of the sample are to be stored in channel 2. Among the number keys on the keyboard, the 0, 1 and 2 keys are depressed in the order mentioned, and then the ENTER key is depressed to complete the operation of designating a unit data processing operation, with a pattern c in FIG. 4 appearing on the screen of the display unit 14.

Then the START/STOP key is depressed, whereupon the spectrophotometer performs wavelength scanning, so that the data of the absorption spectrum of the sample the baseline of which has been corrected are stored in channel 2 of the data memory area in the RAM.

FIG. 6 is a flowchart showing that part of the program of the basic operations of the control circuit C which is concerned with the subtraction operation.

When any one of the keys on the keyboard has been depressed at step A, it is checked at steps B, C and D whether the key depressed is one of those keys in the upper two rows, the FUNCTION key, or the PARAMETER key. If neither of those keys has been depressed, the key depressed belongs to the second group $K_2$ and has been erroneously depressed, so that the operation returns to step A for selection of a proper key in the group $K_1$.

When one of the keys in the upper two rows of the first group $K_1$ has been depressed, it is checked at steps E, F1, ... Fn which of the keys has been depressed.

If the "−" key has been depressed, the pattern $a_1$ shown in FIG. 4 appears on the screen of the display unit 14 at step G, and the operation code of subtraction is stored at address 1 of the work area $m_w$ in the RAM at step H. A plurality, say, eight addresses 1 to 8 of the work area $m_w$ are provided to store therein the codes of the unit data processing operations to be performed sequentially in the order they are to be performed. If a single unit data processing operation is to be performed, the code of that operation is stored at address 1 only. In case of a multiple data processing operation, a plurality, say, eight unit data processing operations can be performed in such a manner that the data processed in the preceeding unit data processing operation is further processed in the succeding unit data processing operation.

At step I subsequent to step H one of the numeral keys in the groups $K_2$ is depressed to designate the number of the channel (channel 0 in the previously mentioned case) where the minuend data to be used in the designated subtraction operation are stored, and the ENTER key is depressed at step J, whereupon the pattern $a_2$ in FIG. 4 appears on the display unit at step K and the number of the channel where the minuend data are stored is placed at address 9 of the work area $m_w$ in the RAM at step L.

At step M, one or more of the numeral keys which either designate the number of the channel where the subtrahend data are stored or express the subtrahend data of a numerical value (0.0 in the previously mentioned case) are depressed, and then the ENTER key is depressed at step N, whereupon the pattern $a_3$ in FIG. 4 is indicated on the display unit at step 0 and the channel number or the numerical value is stored at address 10 of the work area $m_w$ in the RAM at step P.

Finally, at step Q one of the numeral keys is depressed to designate the channel where the result of the subtraction operation is to be stored and the ENTER key is depressed at step R, whereupon the pattern b in FIG. 4 appears at step S and the designated channel number (channel 1 in the previously mentioned case) is stored at address 11 of the work area $m_w$ in the RAM at step T.

When the operation of designating the unit data processing operation has been completed in the above-mentioned manner, the START/STOP key is depressed to start execution of the designated unit data processing operation. Then the control circuit checks at step U the contents of addresses 1 through 8 of the work area $m_w$ in the RAM so as to find that the code of the operation of subtraction is stored at address 1, with the contents of the other addresses 2 through 8 being 0 (zero), and at step V checks addresses 9 through 11 so as to find that the data stored therein are 0, 0.0, and 1, respectively, and then at step W causes the spectrophotometer to perform wavelength scanning in accordance with the program for the operation in the area P2 of the program memory so that the value 0.0 is subtracted from the output of the spectrophotometer and the result of the subtraction is placed in channel 1 of the data memory area in the RAM as baseline data.

From the above description other unit data processing operations can be easily understood so that no explanation will be given.

The operation of setting a multiple data processing operation will now be described. In this case, first the FUNCTION key is depressed, whereupon step numbers 1 to 8 are indicated on the screen of the display unit. Each one of the steps corresponds to a unit data processing operation, and two or more steps up to eight steps can be connected.

The pattern d in FIG. 4 shows that a multiple data processing operation including steps up to the third has been set. The operation of subtraction has been set as the first step in which as indicated (1−, 0, 1, 2) in the uppermost row on the display unit the data in channel 1 is to be subtracted from the data in channel 0, that is, the output of the spectrophotometer, and the difference is to be stored in channel 2. The second step that has been set is the operation of differentiation. The figures to the right of the letter D in the indication of (2 D, 2, 2, 2, 1) in the second upper row on the display unit indicate that the data in channel 2 are to be differentiated and the result is stored again in the same channel 2, that the order of the differentiation is 2, and that the derivative wavelength difference $\Delta\lambda$ is 1 nm.

The third step that has been set is a multi-wavelength data processing operation. As indicated (3 M, 1, 2, 3) in the lowermost row of the display, the multi-wavelength data processing operation in accordance with the program stored in MU1 of the area P3 in the program memory P is to be performed on the data stored in channel 2 of the data memory area in the RAM, so that the result of the operation is placed in channel 3 of the data memory area.

With the multiple data processing operation having been set in the above-mentioned manner, the START/STOP key is depressed, whereupon the first to third steps will be automatically executed.

As previously mentioned, the multi-wavelength data processing operation is an operation such that first a data processing operation of a certain type is performed on a plurality of data obtained from a sample measured with different wavelengths, and that the processed data are further processed in such a manner as to put them together into a synthetic result such as, for example, the mean of all the data, the weighted means thereof, the area calculated, and so on. The areas MU1 to MU4 in the program memory P store the programs for such multi-wavelength data processing operations, one of which is designated for execution.

Thus, in accordance with the invention, the operation of the keys to enter the steps for a multiple data processing operation is much the same as the key operation to execute a unit data processing operation and much easier than if the same multiple data processing operation was executed by using a computer language, so that the operational burden on the operator of the apparatus can be substantially alleviated. Since one of the various unit data processing operations which constitute a multiple data processing operation can be selected for execution, the effect of the data processing operation can be evaluated with ease.

For execution of a plurality of unit data processing operations on a plurality of samples it is not necessary to input into the apparatus parameters for each data processing operation, but operation of the START/STOP key alone suffices to obtain the desired processed data, with resulting reduction of the operational burden on the operator of the apparatus.

What I claim is:

1. Apparatus for spectroanalysis comprising
   a spectrophotometer,
   a first memory for storing programs for different types of unit data processing operations,
   a second memory having a plurality of channels for storing data,
   a keyboard containing a first group of keys for designating said programs, a second group of keys for entering parameters for data processing, and a key for selecting a multiple data processing mode,
   a control circuit operable, upon designation of one of said programs by a corresponding one of said first group of keys, to process the output data produced by said spectrophotometer measuring a sample in accordance with said designated program and, upon selection of a multiple data processing mode and subsequent designation of selected ones of said programs by depressing the corresponding keys of said first group in a selected order, to form a multiple data processing program for performing said designated unit data processing operations sequentially in said selected order and cause the output data of said spectrophotometer to be processed in accordance with said multiple data processing program, and
   a data bus for interconnecting the output of said spectrophotometer, said first and second memories, said keyboard and said control circuit.

2. The apparatus of claim 1, further including a display unit.

3. The apparatus of claim 1, further including a recorder.

4. The apparatus of claim 1, further including a printer.

5. The apparatus of claim 1, wherein said unit data processing operations are the operations of processing the output data from said spectrophotometer by addition, subtraction, multiplication, division, and differentiation, and the operation of processing the output data from said spectrophotometer measuring a sample with different wavelengths, and the operation of processing the output data from said spectrophotometer measuring a sample with a fixed wavelength.

6. The apparatus of claim 1, wherein said multiple data processing operation comprises two or more of said unit data processing operations successively performed in such a manner that the data processed by a preceding one of said unit data processing operations is further processed by a succeeding one of said operations.

* * * * *